(12) United States Patent
Kelley

(10) Patent No.: US 7,360,320 B2
(45) Date of Patent: Apr. 22, 2008

(54) MEASURING DEVICE HAVING FLEXIBLE TAPE COILED AROUND A PLURALITY OF REELS

(76) Inventor: Timothy J. Kelley, 1121 Lecuyer Ct., Stillwater, MN (US) 55082

(*) Notice: Subject to any disclaimer, the term of this patent is extended or adjusted under 35 U.S.C. 154(b) by 0 days.

(21) Appl. No.: 11/411,645

(22) Filed: Apr. 26, 2006

(65) Prior Publication Data
US 2007/0251113 A1 Nov. 1, 2007

(51) Int. Cl.
*G01B 3/10* (2006.01)
*B65H 75/48* (2006.01)

(52) U.S. Cl. .......................... 33/761; 242/376
(58) Field of Classification Search ......... 33/755–771, 33/776; 242/375, 375.3, 376
See application file for complete search history.

(56) References Cited

U.S. PATENT DOCUMENTS

| | | | |
|---|---|---|---|
| 355,320 A * | 1/1887 | Hunt | 33/762 |
| 2,824,374 A * | 2/1958 | Abrams et al. | 33/763 |
| 2,860,215 A * | 11/1958 | Williams | 33/765 |
| 3,731,389 A | 5/1973 | King | |
| 3,862,761 A * | 1/1975 | Conley | 33/761 |
| 3,885,314 A * | 5/1975 | Banas, Sr. | 33/764 |
| 4,171,109 A | 10/1979 | Roe | |
| D253,876 S | 1/1980 | Covey | |
| 4,194,703 A | 3/1980 | Roe | |
| 4,205,448 A | 6/1980 | Asai | |
| 4,275,503 A | 6/1981 | Bergkvist | |
| 4,332,087 A * | 6/1982 | Ellis | 33/759 |
| 4,443,944 A | 4/1984 | Beesley | |
| 4,459,753 A | 7/1984 | Nagasawa et al. | |
| 4,506,446 A | 3/1985 | Mitchell | |
| 4,542,589 A | 9/1985 | Yamamoto | |
| 4,630,376 A | 12/1986 | Pentecost | |
| 4,649,649 A | 3/1987 | Fain | |
| 4,730,783 A | 3/1988 | Lamson | |
| 4,766,673 A | 8/1988 | Bolson | |
| 4,827,622 A | 5/1989 | Makar | |
| 4,907,756 A | 3/1990 | Bourrant | |
| 4,914,830 A | 4/1990 | Legaré | |
| 4,972,600 A | 11/1990 | Nosek | |
| 4,986,487 A | 1/1991 | Irvin | |
| 5,063,686 A | 11/1991 | Peloquin | |
| 5,077,911 A | 1/1992 | von Wedemeyer | |
| 5,119,521 A | 6/1992 | Clontz | |
| 5,154,006 A | 10/1992 | Wooster | |
| 5,210,956 A | 5/1993 | Knispel et al. | |
| 5,367,784 A | 11/1994 | Krebs | |
| 5,402,583 A | 4/1995 | Komura | |

(Continued)

OTHER PUBLICATIONS

"Ultimate Measure . . . Truly The Ultimate Tape Measure," http://www.ultimatemeasure.com/Welcome.htm, 2 pages, Aug. 21, 2002.

*Primary Examiner*—G. Bradley Bennett
(74) *Attorney, Agent, or Firm*—IPLM Group, P.A.

(57) ABSTRACT

A measuring device having a housing and a slot therein with a retractable coiled flexible measuring tape. A plurality of rotatable reels are mounted on separate axes in the housing. A flexible measuring tape having measuring indicia thereon is coiled around the plurality of rotatable reels with a free end of the flexible measuring tape passing through the slot. A coil spring is operably coupled to at least one of the plurality of rotatable reels biasing the flexible measuring tape toward a retracted position.

25 Claims, 5 Drawing Sheets

U.S. PATENT DOCUMENTS

| | | |
|---|---|---|
| 5,414,943 A | 5/1995 | Vogt |
| 5,421,100 A | 6/1995 | Leore |
| 5,426,863 A | 6/1995 | Biggel |
| 5,430,952 A | 7/1995 | Betts |
| 5,435,074 A | 7/1995 | Holevas et al. |
| 5,448,837 A * | 9/1995 | Han-Teng .................... 33/761 |
| 5,481,810 A | 1/1996 | Hastings et al. |
| 5,481,813 A | 1/1996 | Templeton |
| 5,575,077 A | 11/1996 | Jung Tae |
| 5,619,804 A | 4/1997 | Vogt et al. |
| 5,624,085 A | 4/1997 | Usami |
| 5,632,453 A | 5/1997 | Hioki et al. |
| 5,718,056 A | 2/1998 | Miyasaka et al. |
| 5,735,052 A | 4/1998 | Lin |
| 5,809,662 A | 9/1998 | Skinner |
| D399,149 S | 10/1998 | Bennett |
| 5,832,622 A | 11/1998 | Mann |
| 5,842,284 A | 12/1998 | Goldman |
| 5,857,261 A | 1/1999 | Li |
| 5,897,708 A | 4/1999 | Hsu |
| 5,992,038 A | 11/1999 | Harmon et al. |
| 6,026,585 A | 2/2000 | Li |
| 6,032,379 A | 3/2000 | Usami |
| 6,053,447 A | 4/2000 | Omri |
| 6,085,433 A | 7/2000 | Li |
| 6,108,926 A | 8/2000 | Fraser et al. |
| RE36,887 E | 10/2000 | Goldman |
| 6,212,787 B1 | 4/2001 | Dixon |
| 6,223,443 B1 | 5/2001 | Jacobs |
| 6,223,446 B1 | 5/2001 | Potter |
| 6,224,038 B1 | 5/2001 | Walsten et al. |
| 6,226,886 B1 | 5/2001 | Lamond et al. |
| 6,237,243 B1 | 5/2001 | Cook |
| 6,276,071 B1 | 8/2001 | Khachatoorian |
| 6,295,740 B1 | 10/2001 | Mitchell |
| 6,349,482 B1 | 2/2002 | Gilliam |
| 6,715,214 B1 * | 4/2004 | Lin ............................. 33/755 |
| 7,003,895 B2 * | 2/2006 | Harris et al. .................. 33/755 |
| 7,024,790 B1 * | 4/2006 | Qilian ......................... 33/755 |
| 2005/0223582 A1 * | 10/2005 | Baugh ......................... 33/764 |
| 2006/0038050 A1 * | 2/2006 | Hui ............................. 33/755 |

* cited by examiner

MEASURING DEVICE HAVING FLEXIBLE TAPE COILED AROUND A PLURALITY OF REELS

TECHNICAL FIELD

This invention relates to measuring devices and, more particularly, to measuring devices using a flexible tape retractably coiled inside a housing.

BACKGROUND

Measuring devices using retractable coiled flexible tapes mounted inside a housing are well known in the art. A common type of such a measuring device has a housing having a slot. A flexible tape having measuring indicia thereon is coiled around a reel mounted inside the housing with a free end of the flexible tape extending through the slot. A retraction mechanism, typically a coil spring, acts upon the reel biasing the flexible tape in the retracted position. In use, a user pulls enough of the flexible tape from the housing through the slot to make the desired measurement using the indicia located on the flexible tape. When the user has completed making the measurement, the flexible tape is rewound onto the reel and stored inside the housing. Such common retractable flexible tape measuring devices are found in many toolboxes around the world.

Over the years, many variations of the basic flexible retractable tape measuring device have been made.

An example is seen in U.S. Pat. No. 6,276,071, Khachatoorian, Tape Measure With Tape Breaking Control Mechanism, discloses a spring-loaded tape cartridge in a tape measure including a coilable tape rotatably mounted to position a free end of the tape to pass through an opening in the housing. The tape cartridge is biased to retract the tape into the compartment when the free end is pulled out of the housing to perform a measurement. A stop tab at the free end engages the workpiece and assures that the free end remains outside the housing and available for gripping. An internal spring portion acts between the housing and the tape cartridge for applying a substantially constant frictional force on the tape cartridge. This particular measuring device has a second spring portion for selectively applying increased and decreased frictional forces on the tape cartridge to supplement the substantially constant frictional force. A locking member is provided for selectively applying a substantially normal pressure to the tape, transverse to the movement path, to positively lock the tape against the housing and prevent the tape from moving relative to the housing.

U.S. Pat. No. 6,349,482, Gilliam, Three Position Locking Mechanism For a Tape Measure, discloses a retractable tape measure having a flexible tape biased in a coiled position and a housing to contain the flexible tape. The flexible tape (20) is coiled around one shaft (24). A tape biasing device (40) is mounted within the housing using a spring (42) strung between two separate shafts (see 44 and 46) separate from the axis of the flexible tape (20). The tape measure also includes a locking mechanism (50).

U.S. Pat. No. 5,119,521, Clontz, Tape Measure for Hand Tools, discloses a tape measure frame assembly for installation within the handle of a hand tool. The assembly includes a gearing connection between the tape and a retracting spring, which enables the assembly to be elongated in conformity with the tool handle. Coiled spring (12) is wrapped in two coils (12A and 12B) around shafts (16 and 15, respectively). Flexible tape (T) is wrapped around a single rotatable shaft (20).

U.S. Pat. No. 5,414,943, Vogt, Anatomical Measuring Tape With Indicator, discloses a measuring device with a different twist. The measuring device has two measuring tapes held on separate reels in a housing. The housing has two windows for displaying measurement indicia appearing on each tape. The tapes are spring biased toward the fully wound condition. The two tapes contained within one housing are held on separate reels and operate independently. Each tape is held on a single reel.

U.S. Pat. No. 5,832,622, Mann, Direct Reading Inside and Outside Tape Measure, discloses a measuring tape which allows both inside and outside dimensions to be read directly from the same printed face of the tape. The tape measure has a case having a tape coiled inside the case and extending out of the case through a slot in the case. Inside the case is a guide wheel which guides the tape along a bottom wall of the case. The front wall of the case is transparent so that the graduations on the tape can be seen adjacent to the bottom wall. A pointer on the case points to the graduations such that when the tape is fully retracted, the pointer points to a measurement corresponding to the width of the case. This enables the case and the tape to be used to make inside measurements. Flexible measuring tape (20) is wound around single reel (24) inside the case to form a coil. A separate wheel (34) is fixed on shaft (32) which forces tape (20) near wall (22) as tape (20) is unwound from reel (24) around which tape (20) is stored.

It is also desirable to be able maximize the length of measurement which can be taken with the flexible tape measuring device. This can be done by increasing the length of the flexible tape stored within the housing. However, since a given flexible tape has a finite thickness, the more tape that is wrapped around the storage reel inside the housing, the greater the diameter of the wound reel. The greater the diameter of the wound, the greater the overall size of the housing must be. Not only does the an increased housing size take up more space in a tool box, but, more importantly, the larger the measuring device in the hand of the user, the more difficult that it is to hold comfortably and reliably. Thus, common flexible tape measuring devices have a realistic maximum amount of flexible tape that can be reasonably stored within the housing based upon the thickness of the flexible tape and a required maximum housing size for comfortable and reliable use. While flexible tapes possibly can be made thinner allowing more tape to be held on the reel, a thinner tape usually does not perform as well in taking measurements. It is desirable to have a flexible tape which is thick enough to have some rigidity so it is easier for one person to make a measurement. Thus, thinner tape is not the answer either.

SUMMARY OF THE INVENTION

The present invention provides a flexible tape measuring device which achieves the advantage of holding a greater amount of flexible tape than prior art devices while maintaining a comfortable easy-to-use size and form factor. Alternatively, a similar length of flexible tape may be used but a thicker tape can be used with the flexible tape being relatively stiffer when withdrawn from the housing making it easier for one person to perform relatively longer distance unsupported measurements.

The present invention achieves these advantages, in part, by storing the flexible tape around a plurality of reels inside the housing rather than around a single reel. Storing the flexible tape around a plurality of reels on separate axes allows not only the diameter of a plurality of reels to store the retracted flexible tape but also the distance between the plurality of reels. This allows for much more flexible tape of a given thickness to be stored in the housing. While the plurality of reels take more space than a single reel, the plurality of reels actually achieves a smaller profile since the flexible tape is wound around and around both reels taking advantage of the distance between the reels. The resultant housing containing the plurality of reels may be made more rectangular, and less square, than conventional flexible tape measuring devices. The more rectangular shape allows a shorter, for instance, and longer housing for a given amount of flexible tape of a given thickness. The shorter height allows the measuring device to fit more comfortably and reliably in the hand of a user than would a more squarish conventional flexible tape measuring device. Further, the more rectangular housing better supports the flexible tape in an extended position due to the mechanical advantage of the rectangular housing.

The present invention provides a measuring device having a housing having a slot therein. Rotatable reels are mounted on separate axes in the housing. A flexible measuring tape having measuring indicia thereon is coiled around the plurality of rotatable reels with a free end of the flexible measuring tape passing through the slot. A coil spring is operably coupled to at least one of the plurality of rotatable reels biasing the flexible measuring tape toward a retracted position.

In a preferred embodiment, the flexible measuring tape is coiled around two rotatable reels.

In a preferred embodiment, the coil spring is mounted on a third axis between the separate axes.

In a preferred embodiment, the separate axes are positioned forward and aft from a direction in which the flexible measuring tape extends through the slot.

In a preferred embodiment, an opposite end of the flexible measuring tape from the free end is affixed to one of the rotatable reels.

In a preferred embodiment, the coil spring is operably coupled to the rotatable reels.

In a preferred embodiment, the coil spring is operably coupled to at least one of the rotatable reels with gears.

In a preferred embodiment, a belt is positioned around the rotatable reels between each of the rotatable reels and the flexible measuring tape.

In a preferred embodiment, the belt couples the rotatable reels in common rotatable relationship.

In an alternative embodiment, the present invention provides a method of assembling a measuring device having a housing with a slot therein. A plurality of rotatable reels are mounted on separate axes in the housing. A flexible measuring tape having measuring indicia thereon is coiled around the plurality of reels with a free end of the flexible measuring tape passing through the slot. A coil spring is coupled to at least one of the plurality of rotatable reels biasing the flexible measuring tape toward a retracted position.

In an alternative embodiment, the present invention provides a method of using a measuring device to obtain a measurement. The measuring device has a housing having a slot therein, a plurality of rotatable reels mounted on separate axes in the housing and a flexible measuring tape having measuring indicia thereon. The flexible measuring tape is coiled around the plurality of rotatable reels with a free end of the flexible measuring tape passing through the slot. The flexible measuring tape is pulled from the slot of the housing. The measurement is obtained. The flexible measuring tape is stored around the plurality of rotatable reels within the housing.

DETAILED DESCRIPTION

Conventional flexible tape measuring devices use a single reel to store flexible tape inside a housing. The single reel typically includes a coil spring wound on the inner diameter of the reel with the flexible tape wrapped around the outer diameter of the reel. A flexible tape measuring device having a 25 foot (7.6 meter) flexible tape typically has a reel having an inner diameter of 2 inches (5.1 centimeters) with an outer diameter, including the flexible tape, of 2.64 inches (6.7 centimeters). The outer diameter of the reel has a circumference of approximately 6.31 inches (16.0 centimeters). Therefore, one wrap of the flexible tape around the reel stores approximately 6.31 inches (16.0 centimeters) of flexible tape. In order to accommodate a 25 foot (7.6 meter) flexible tape, the flexible tape must be wrapped around the reel approximately 48 times. The more times that the flexible tape is wrapped around the reel, the larger the outside diameter of the reel becomes.

The present invention stores the flexible tape by wrapping or coiling the flexible tape around multiple reels. The multiple reel flexible tape storage allows the measuring device of the present invention to use thicker tapes, differing tape material or allows a more compact, easier to handle, housing design.

Figure 1:
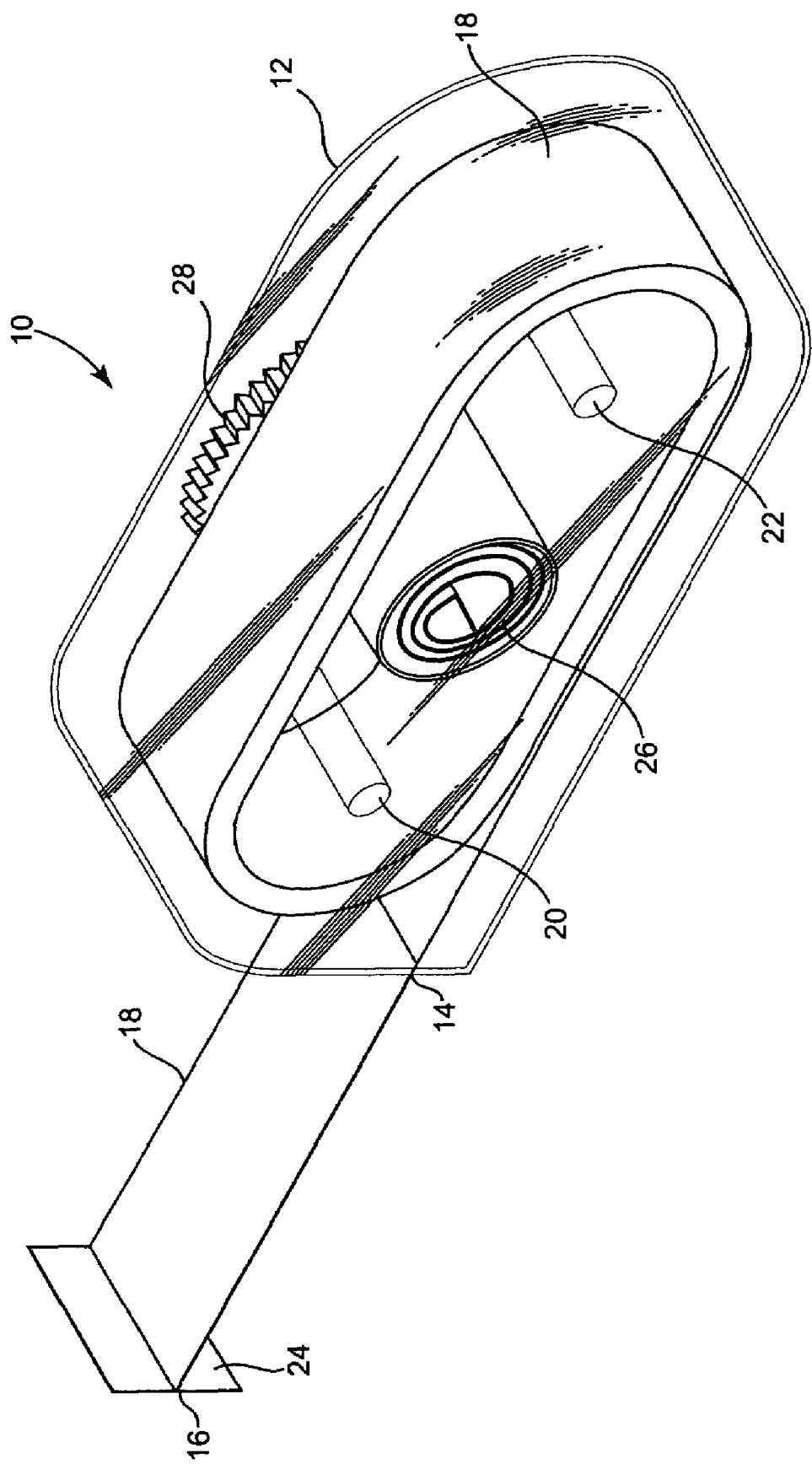
FIG. 1 is a partial perspective view illustrating the preferred embodiment of the measuring device of the present invention minus the reels onto which the flexible tape is mounted.

A preferred embodiment of the measuring device 10 is illustrated in FIG. 1. Measuring device 10 is enclosed in housing 12 having an opening, such as a slot, 14 through which a free end 16 of flexible tape 18 extends. Flexible tape 18 is stored wrapped or coiled around two reels (not shown, however, shafts 20, 22, onto which the two reels are mounted, are shown in FIG. 1). Preferably, free end 16 of flexible tape 18 has lip 24 which prevents flexible tape 18 from being withdrawn completely into housing 12 through slot 14 when measuring device 10 is not being used. Free end 16 of flexible tape 18, prevented from being withdrawn into housing 16, is then available to be grasped by the user when measuring device 10 is next used. Coil spring 26, as will be more fully illustrated and explained with respect to later Figures, operates in conjunction with gear 28 to tension at least one of the reels and, hence, flexible tape 18 for retraction into a withdrawn or wound configuration.

When measuring device 10 is not being used, flexible tape 18 is almost fully stored wound around the two reels mounted on shafts 20, 22. When measuring device is used, the user grasps free end 16 of flexible tape 18 and pulls a desired length of flexible tape 18 from housing 12 through slot 14. Flexible tape 18 at least partially unwinds from reels mounted on shafts 20, 22 as flexible tape 18 is drawn from housing 12. The amount of flexible tape 18 which can be drawn from housing 12, and thus used for measuring purposes, is limited by the amount of flexible tape 18 stored on reels mounted on shafts 20, 22. Flexible tape 18 has measuring indicia, such as feet and inches and fractions thereof marked thereon to facilitate measurements. It is preferred that flexible tape 18 be somewhat cupped when drawn in its free state outside of housing 12 in order to provide some rigidity to flexible tape 18 when used for unsupported measuring purposes.

As can be seen in FIG. 1, shafts 20, 22 have separate axes and are spaced apart a distance which allows flexible tape 18 to be stored not only on both reels but also in the distance between the reels as indicated by shafts 20, 22. Shafts 20, 22 are positioned front and back, or forward and aft, with respect to a front of housing 12 as represented by slot 14. Positioning shafts 20, 22 in this manner allows housing 12 to have a longer front to back dimension and a shorter top to bottom dimension than would have been feasible had flexible tape 18 been stored wound on a single reel.

Figure 2:
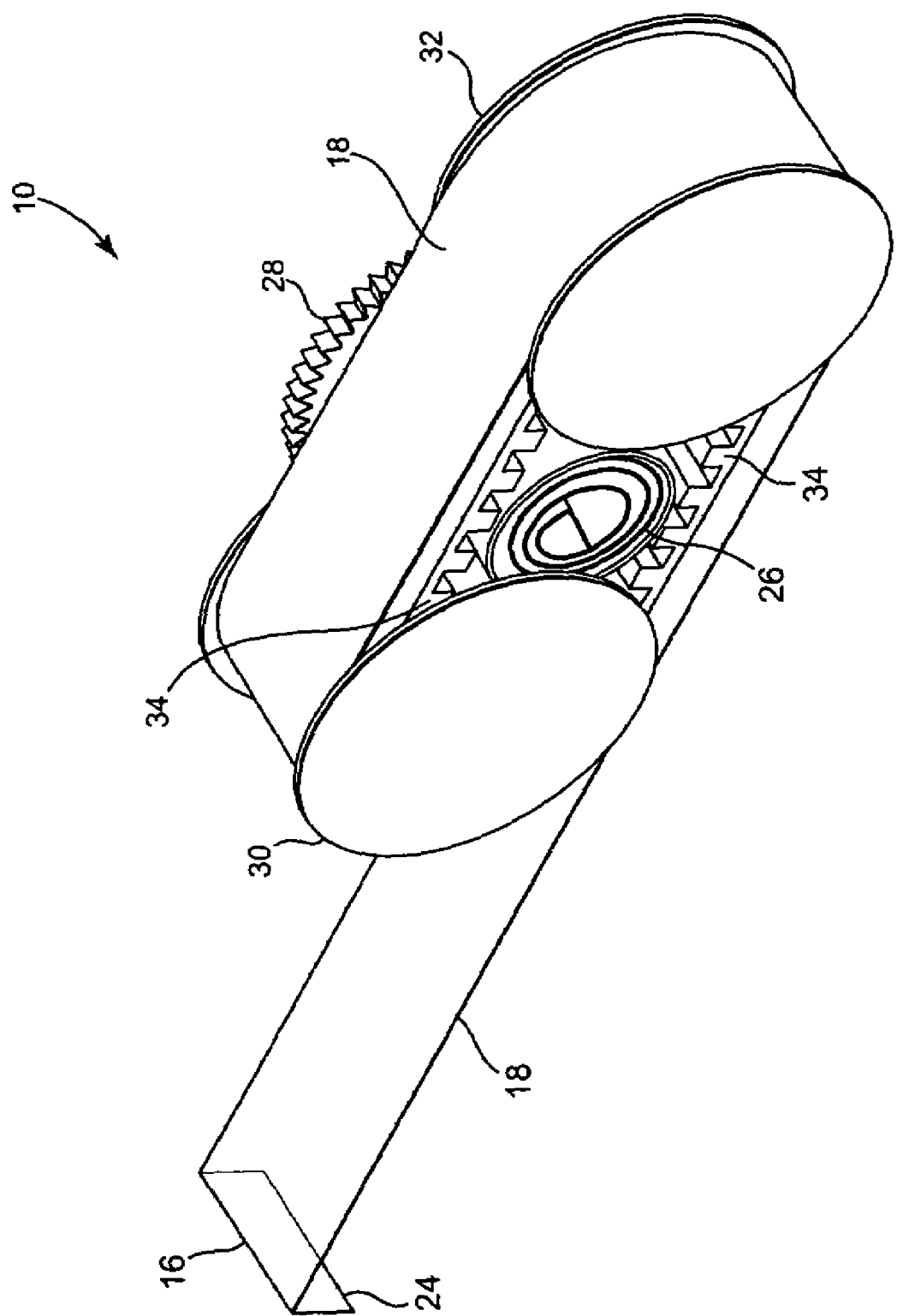
FIG. 2 is a partial perspective view illustrating the preferred embodiment of the measuring device of the present invention minus the housing encompassing the reels, flexible tape, belt, spring and gears.

FIG. 2 provides a somewhat different view of the same measuring device as previously illustrated in FIG. 1. In FIG. 2, measuring device 10 is partially illustrated without housing 12 for greater clarity. Front reel 30 is mounted on shaft 20 (illustrated in FIG. 1) and rear reel 32 is mounted on shaft 22 (also illustrated in FIG. 1). Belt 34 is positioned around front reel 30 and rear reel 32 ensuring that both front reel 30 and rear reel 32 operate in synchronized rotation. Tape 18 is again wound or coiled around front reel 30 and rear reel 32 outside of belt 34 and the space between front reel 30 and rear reel 32. Coil spring 26 is mounted on a separate shaft 36 positioned between front reel 30 and rear reel 32. Mounting coil spring 26 in this position increases the amount of flexible tape 18 which may be stored in housing 12 by both eliminating the space on one of either front reel 30 or rear reel 32 by the thickness of coil spring 26 and by lengthening the distance between shafts 20, 22 increasing the storage space between front reel 30 and rear reel 32.

Figure 3:
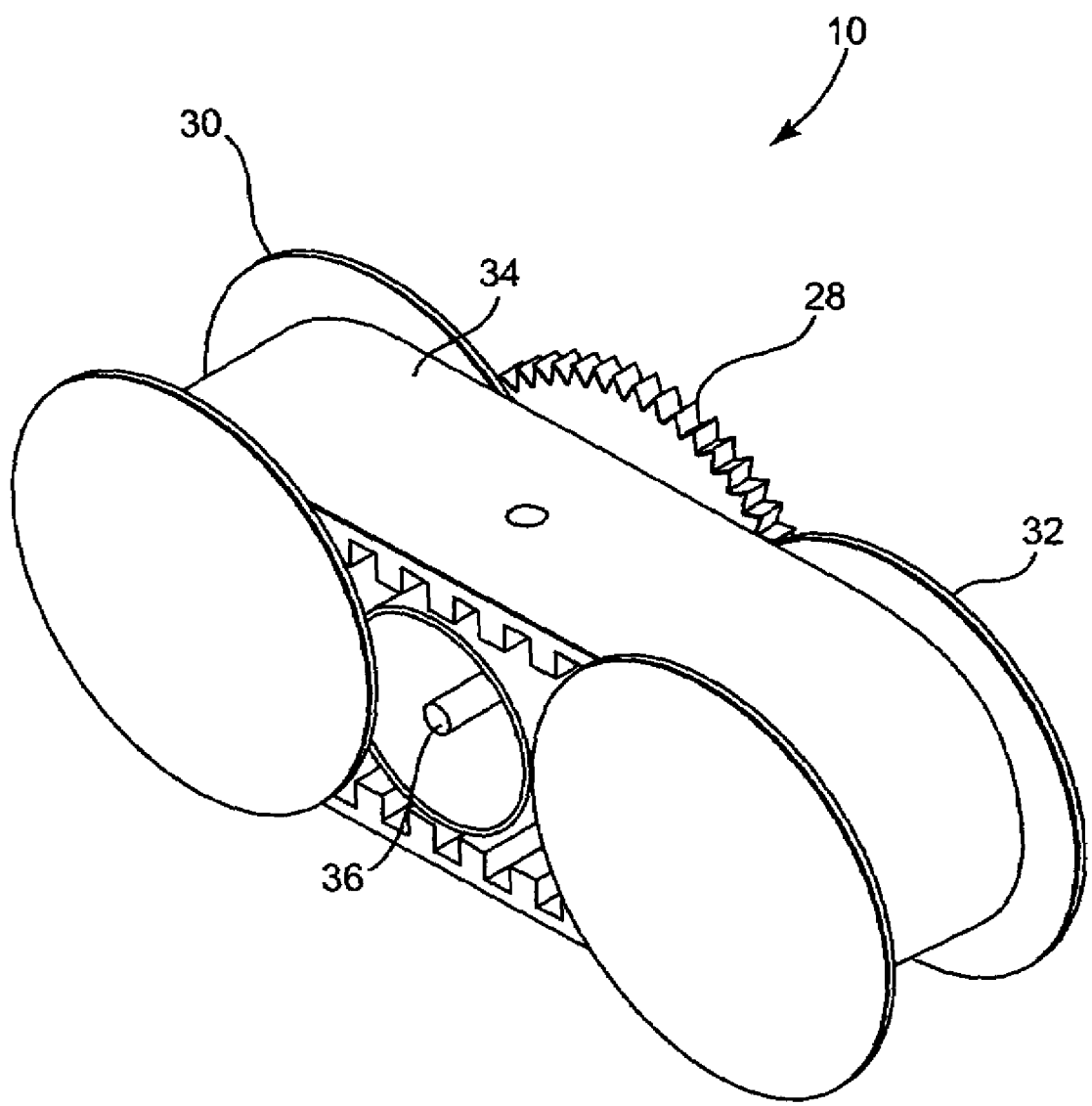
FIG. 3 is a partial perspective view illustrating the preferred embodiment of the measuring device of the present invention showing the interaction of the reels, belt and gears.
Figure 4:
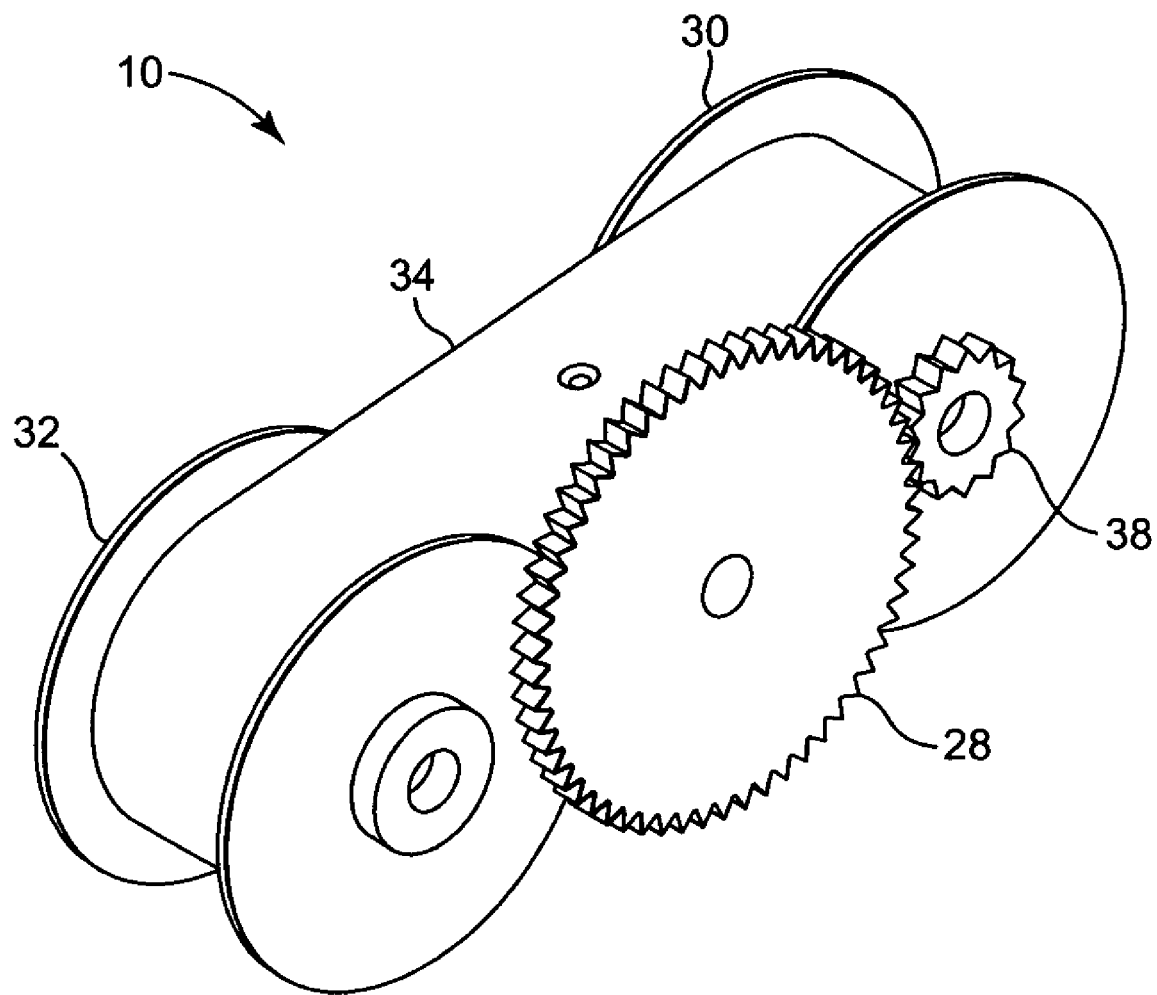
FIG. 4 is the partial perspective view of FIG. 3 taken from the opposite side.

FIG. 3 and FIG. 4 illustrates a more detailed view of the operation of the reels 30, 32, belt 34 and gears, including gear 28, of measuring device 10 first illustrated in FIG. 1. The view illustrated in FIG. 3 and FIG. 4 does not include, for clarity purposes, housing 12, flexible tape 18 nor coil spring 26. Belt 34 is shown positioned around front reel 30 and rear reel 32 in order to maintain rotational consistency between front reel 30 and rear reel 32. When measuring device 10 is fully assembled, flexible tape 18 (not shown) would be wound around both front reel 30 and rear reel 32 outside of belt 34. Coil spring 26 (not shown) is positioned on its own axis on spring shaft 36 located between shafts 20, 22. Gear 28 is rotationally fixed to spring shaft 36 or coil spring 26. Gear 28 mates with reel gear 38 that is rotationally fixed to front reel 30 or shaft 20. Coil spring 26 keeps gear 28 in rotational tension which, in turn, keeps front reel 30, via reel gear 38, in rotational tension. Since flexible tape 18 (not shown) is wound around rear reel 32, flexible tape 18 is also in rotational tension with a tendency to be retracted into housing 12 and stored wound around front reel 30 and rear reel 32. It is preferred that gear 28 have more teeth than reel gear 38 for mechanical advantage.

Note that gear 28 is rotationally coupled to front reel 30 via reel gear 38 and that rear reel 32 is rotationally coupled to front reel 30 via belt 34. It is to be recognized and understood that coil spring 26, rear reel 32 and front reel 30 may be kept rotationally coupled in other manners. For example, gear 28 may be rotationally coupled via a gearing arrangement to rear reel 32 instead of to front reel 30. Further, it is possible that gear 28 may also be mechanically coupled through a gearing arrangement with front reel 30 as well as to rear reel 32. This arrangement could eliminate the need for belt 34. And it is further contemplated that in an embodiment that coil spring 26 may be wound on either front reel 30 or rear reel 32, or both, eliminating the need for separate spring shaft 36.

Figure 5:
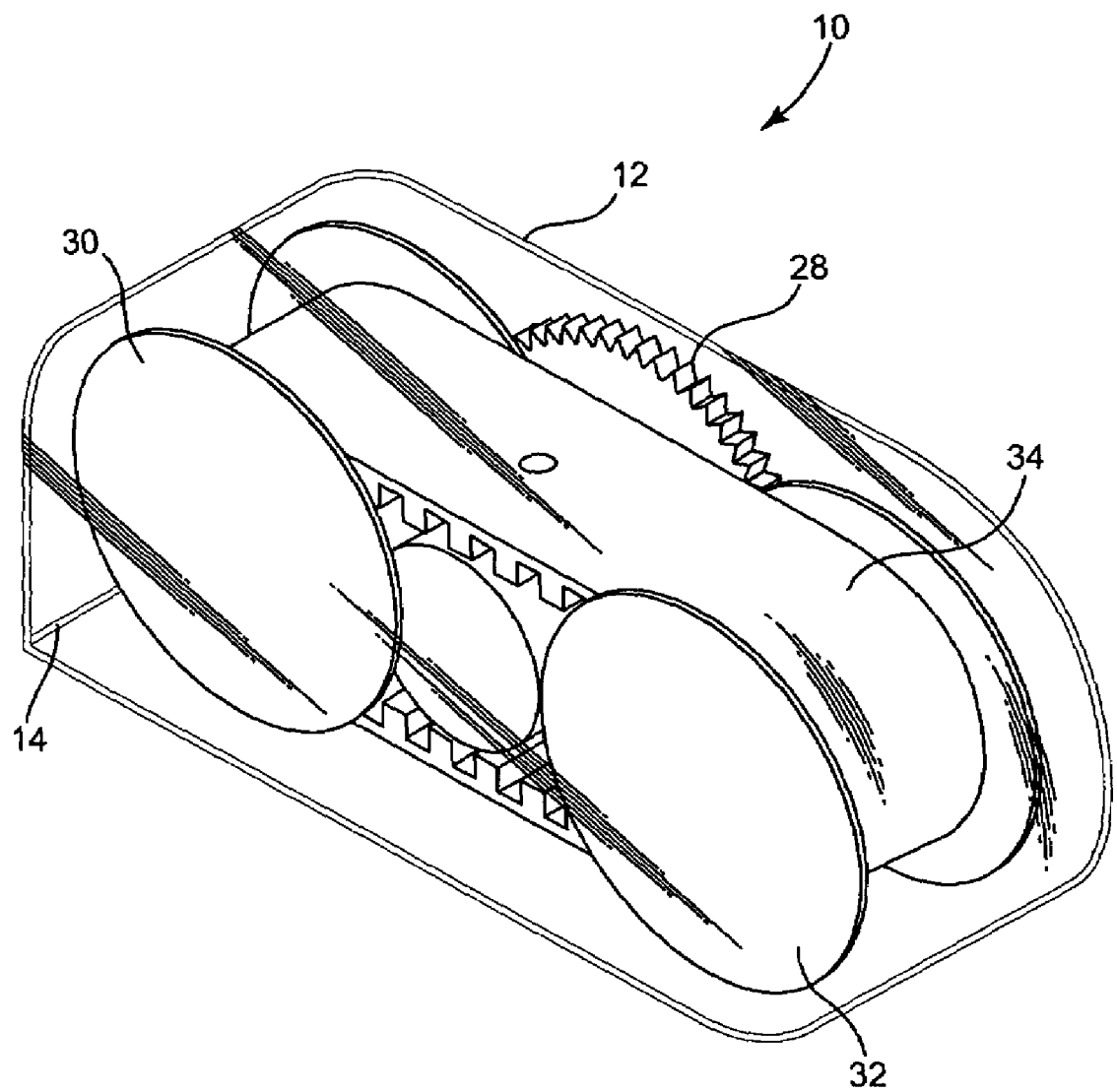
FIG. 5 is a partial perspective view illustrating the preferred embodiment of the measuring device of the present invention showing the interaction between the reels, belt, gears and the housing but minus the spring and the flexible tape.

FIG. 5 shows yet another illustration of measuring device 10 first illustrated in FIG. 1 which shows front reel 30, rear reel 32, belt 34 and gear 28 mounted inside housing 12. For clarity, the view illustrated in FIG. 5 does not include coil spring 26 or flexible tape 18.

It is to be recognized and understood that while measuring device 10 has been described in a preferred embodiment in FIGS. 1 through 5 as having two reels (front reel 30 and rear reel 32), that measuring device 10 could be constructed having more than two reels. For example, measuring device 10 of the present invention could have a third reel to support an even greater distance around which flexible tape 18 could be stored further increasing the capacity of measuring device 10. By extension, further reels could also be added.

Measuring device 10 of the present invention may accommodate flexible tapes 18 of differing thicknesses and lengths by varying the reel diameter and by varying the distance between front reel 30 and rear reel 32. For instance, measuring device 10 using a 25 foot (7.6 meter) flexible tape could have two reels having an outer diameter, including flexible tape 18, of 1.60 inches (4.1 centimeters). The distance between shafts 20, 22 would be 3.75 inches (9.5 centimeters) apart. This arrangement would have a circumference for storing flexible tape 18 of approximately 11.4 inches (29.1 centimeters). For a 25 foot (7.6 meter) flexible tape 18, flexible tape 18 would need to be wrapped around reels 30, 32 about 26.3 times.

Currently, plastic tapes are not used in conventional flexible tape measuring devices (generally flexible tape measuring devices using flexible tapes of 25 feet (7.6 meters) or less) because the thickness of a plastic tape is typically 3 to 4 times thicker (approximately 0.025 inches (0.6 millimeters)) than that of steel tapes (typically 0.0067 inches (0.17 millimeters).

Use of a thicker flexible tape 18 would allow a user to extend the flexible tape 18 unsupported over a longer distance. For example, the Stanley™ Fat Max™ measuring tape advertises an unsupported distance of 11 feet (3.35 meters) using 0.0067 inch (0.17 millimeters) thick flexible tape. Measuring device 10 of the present invention could extend this unsupported distance at 13 feet (4.0 meters) using a slightly thicker 0.0082 inch (0.21 millimeters) thick flexible tape 18.

Further, the multiple reel design of measuring device 10 of the present invention allows a housing 12 better adapted to fit the user's hand. Housing 12 can be shaped more like a handle than a conventional tape measure case that is shaped like a square with rounded corners or a circular shaped object. Housing 12 for the preferred embodiment of the present invention using a 25 foot (7.6 meter) flexible tape 18 could be designed having overall dimensions of 1.5 inches (3.8 centimeters) wide, 5.5 inches (14.0 centimeters) in length and only 1.75 inches (4.45 centimeters) in height. This compares to typical dimensions of a convention flexible tape measuring device, using the same 25 foot (7.6 meter) flexible tape are 1.5 inches (3.8 centimeters) wide, 3 inches (7.6 inches) in length and 3 inches (7.6 inches) in height. Thus, the multiple reel design of the present invention has reduced the overall height of measuring device 10 by approximately 1.2 inches (3.18 centimeters). This smaller dimension makes measuring device 10 much easier to fit in a user's hand enabling the user to use measuring device 10 longer, by reducing fatigue, and more reliably. The longer and shorter dimensions of measuring device 10 provide the user with a more "handle-like" mechanical advantage allowing the user to better support flexible tape 18 in an extended position.

Various modifications and alterations of this invention will be apparent to those skilled in the art without departing from the scope and spirit of this invention. It should be understood that this invention is not limited to the illustrative embodiments set forth above.

What is claimed is:

1. A measuring device, comprising:
   a housing having a slot therein;
   two rotatable reels mounted on separate axes in said housing;
   a flexible measuring tape having measuring indicia thereon, said flexible measuring tape being coiled around said two rotatable reels with a free end of said flexible measuring tape passing through said slot; and
   a coil spring operably coupled to at least one of said two rotatable reels, said coil spring biasing said flexible measuring tape toward a retracted position;
   wherein said coil spring is mounted within said housing on a third axis between said separate axes.

2. The measuring device of claim 1 wherein said coil spring is operably coupled to both of said two rotatable reels.

3. The measuring device of claim 1 wherein said coil spring is operably coupled to at least one of said two rotatable reels with gears.

4. The measuring device of claim 1 which further comprises a belt positioned around said two rotatable reels between each of said two rotatable reels and said flexible measuring tape.

5. The measuring device of claim 4 wherein said belt operates by coupling said two rotatable reels in common rotatable relationship.

6. The measuring device of claim 1 wherein said separate axes are positioned forward and aft from a direction in which said flexible measuring tape extends through said slot.

7. The measuring device of claim 1 wherein an opposite end of said flexible measuring tape from said free end is affixed to one of said two rotatable reels.

8. The measuring device as in claim 1 wherein said third axis is positioned between said separate axes.

9. A measuring device, comprising:
   a housing having a slot therein;
   a plurality of rotatable reels mounted on separate axes in said housing;
   a flexible measuring tape having measuring indicia thereon, said flexible measuring tape being coiled around said plurality of rotatable reels with a free end of said flexible measuring tape passing through said slot;
   a coil spring operably coupled to at least one of said plurality of rotatable reels, said coil spring biasing said flexible measuring tape toward a retracted position;
   wherein said coil spring is mounted within said housing on a third axis between said separate axes.

10. The measuring device of claim 9 wherein said coil spring is operably coupled to at least two of said plurality of rotatable reels.

11. The measuring device of claim 9 wherein said coil spring is operably coupled to at least one of said plurality of rotatable reels with gears.

12. The measuring device of claim 9 which further comprises a belt positioned around at least two of said plurality of rotatable reels between each at least two of said plurality of rotatable reels and said flexible measuring tape.

13. The measuring device of claim 12 wherein said belt operates by coupling said at least two of said plurality of rotatable reels in common rotatable relationship.

14. The measuring device of claim 9 wherein at least two of said separate axes are positioned forward and aft from a direction in which said flexible measuring tape extends through said slot.

15. The measuring device of claim 9 wherein an opposite end of said flexible measuring tape from said free end is affixed to at least one of said plurality of rotatable reels.

16. The measuring device as in claim 9 wherein said third axis is positioned between said separate axes.

17. A method of assembling a measuring device, said measuring device having a housing having a slot therein, comprising the steps of:
   mounting a plurality of rotatable reels on separate axes in said housing;
   coiling a flexible measuring tape having measuring indicia thereon around said plurality of rotatable reels with a free end of said flexible measuring tape passing through said slot;
   coupling a coil spring to at least one of said plurality of rotatable reels, said coil spring biasing said flexible measuring tape toward a retracted position; and
   mounting said coil spring within said housing on a third axis between said separate axes.

18. The method of claim 17 wherein said coupling step couples said coil spring to at least two of said plurality of rotatable reels.

19. The method of claim 17 wherein said coupling step couples said coil spring to at least one of said plurality of rotatable reels with gears.

20. The method of claim 17 which further comprising the step of positioning a belt around at least two of said plurality of rotatable reels between each at least two of said plurality of rotatable reels and said flexible measuring tape.

21. The method of claim 20 wherein said positioning step couples said belt to at least two of said plurality of rotatable reels in common rotatable relationship.

22. The method of claim 17 wherein at least two of said separate axes are positioned forward and aft from a direction in which said flexible measuring tape extends through said slot.

23. The method of claim 17 wherein an opposite end of said flexible measuring tape from said free end is affixed to at least one of said plurality of rotatable reels.

24. The method as in claim 17 wherein said mounting step further comprises mounting said coil spring on said third axis between said separate axes.

25. A method of using a measuring device to obtain a measurement, said measuring device having a housing having a slot therein, a plurality of rotatable reels mounted on separate axes in said housing, a coil spring mounted on a third axis operably coupled to at least one of said plurality of rotatable reels, said coil spring biasing said measuring device toward a retracted position, a flexible measuring tape having measuring indicia thereon, said flexible measuring tape being coiled around said plurality of rotatable reels with a free end of said flexible measuring tape passing through said slot, comprising the steps of:

pulling said flexible measuring tape from said slot of said housing;

obtaining said measurement; and storing said flexible measuring tape around said plurality of rotatable reels within said housing.

* * * * *